US005788055A

United States Patent [19]

Stewart et al.

[11] Patent Number: 5,788,055
[45] Date of Patent: Aug. 4, 1998

[54] AUGER WITH SEALED HOPPER JOINT

[75] Inventors: Ronald S. Stewart, Rock Rapids; Ronald F. Bechler, George, both of Iowa

[73] Assignee: Sudenga Industries, Inc., George, Iowa

[21] Appl. No.: 947,246

[22] Filed: Oct. 8, 1997

[51] Int. Cl.⁶ .................................................. B65G 33/00
[52] U.S. Cl. ........................... 198/671; 414/505; 414/523; 198/670
[58] Field of Search .............................. 198/657, 658, 198/662, 666, 667, 670, 671; 414/504, 505, 523, 526

[56] References Cited

U.S. PATENT DOCUMENTS

| | | | |
|---|---|---|---|
| 3,700,179 | 10/1972 | Van Peussem | 198/662 X |
| 4,963,066 | 10/1990 | Boppart | 414/376 |
| 5,184,715 | 2/1993 | Feterl | 414/505 X |
| 5,409,344 | 4/1995 | Tharaldson | 414/523 X |
| 5,492,217 | 2/1996 | Stewart | 198/667 |

*Primary Examiner*—James R. Bidwell
*Attorney, Agent, or Firm*—Kinney & Lange, P.A.

[57] ABSTRACT

An improved auger assembly for providing a sealed path for transport of grain. The improved auger assembly includes a first angularly adjustable hopper tube, a second hopper tube, and a joint mechanism. The first angularly adjustable hopper tube contains a first auger for transporting grain from a first grain-containing volume. The second hopper tube contains a second auger for transporting grain to a second grain-containing volume. The joint mechanism couples the first and second hopper tubes and allows the grain transported by the first auger from the first grain-containing volume to be further transported by the second auger to the second grain-containing volume. The joint mechanism includes flexible flaps that sealably couple the first hopper tube and the second hopper tube at all angular orientations of the first hopper tube relative to the second tube.

20 Claims, 3 Drawing Sheets

5,788,055

1
AUGER WITH SEALED HOPPER JOINT

BACKGROUND OF THE INVENTION

The present invention relates generally to an auger system for use in the movement of grain. More particularly, the present invention relates to an auger system with a sealed hopper joint.

After grain is harvested, it is typically necessary to transport the grain to a temporary storage area prior to further processing of the grain to make the grain ready for consumption. One such storage device is a silo, and grain is typically conveyed into such silos using a portable auger system. One such portable auger system is disclosed in Stewart, U.S. Pat. No. 5,492,217, which is assigned to the assignee of the present application.

In certain circumstances, grain is transported in trucks or trailers that unload by releasing the grain through outlets on the bottom of the truck or trailer. To facilitate unloading of grain from these types of trucks and trailers, portable grain conveying systems have been developed that have a grain hopper that fits beneath the truck or trailer. One such portable hopper is described in Boppart, U.S. Pat. No. 4,963,066.

Grain conveying systems used in conjunction with grain hoppers that fit beneath a truck or trailer frequently have a first auger portion that is attached to the hopper and a second auger portion, which is pivotally attached to the first auger portion and leads to the silo, such as the grain conveying system described in the Boppart patent. These types of auger systems are conventionally referred to as "swing around hopper" systems.

A drawback of the grain conveying disclosed in the Boppart patent is that the pivot joint where the first auger portion and the second auger portion intersect is not sealed to prevent water, such as in the form of rain or water, from entering into the auger mechanisms. When water enters the pivot joint, the water mixes with grain residue in the pivot joint, and the grain can cake up or form a mud-like composition that interferes with the subsequent operation of the grain conveying system.

BRIEF SUMMARY OF THE INVENTION

On a portable auger which incorporates a swing around hopper, the discharge at the end of the lower incline tube on the hopper is required to pivot in virtually all directions as the auger is raised and lowered and the hopper is rotated around the auger. To accomplish this feat tends to leave the intake boot of the portable auger susceptible to the elements in one position or another. The intake boot of the portable auger is usually left with grain and grain dust in the bottom and once rain or melted snow is added, this turns to mud which plugs any drain holes incorporated in the design. The present invention is intended to seal the hopper discharge to the intake boot of the portable auger thus eliminating the previously described problem. The device consists of an upper box mounted on the end of the lower incline tube in a manner to allow the tube to rotate around its axis and said box to remain stationary. This box is closed on all four sides and the top.

The present invention is an improved auger assembly that provides a sealed path for transport of grain. The auger assembly includes a first angularly adjustable hopper tube, a second hopper tube, and a joint mechanism. The first angularly adjustable hopper tube contains a first auger for transporting grain from a first grain-containing volume. The second hopper tube contains a second auger for transporting grain to a second grain-containing volume. The joint mechanism couples the first and second hopper tubes and allows the grain transported by the first auger from the first grain-containing volume to be further transported by the second auger to the second grain-containing volume. The joint mechanism includes flexible flaps that sealably couple the first hopper tube and the second hopper tube at all angular orientations of the first hopper tube.

While the above-identified drawing figures set forth preferred embodiments of the invention, other embodiments are also contemplated, as noted in the discussion. In all cases, this disclosure presents the present invention by way of representation and not limitation. It should be understood that numerous other modifications and embodiments can be devised by those skilled in the art which fall within the scope and spirit of the principles of this invention. It should be specifically noted that the figures have not been drawn to scale as it has been necessary to enlarge certain portions for clarity.

DETAILED DESCRIPTION OF THE PREFERRED EMBODIMENTS

Figure 1:
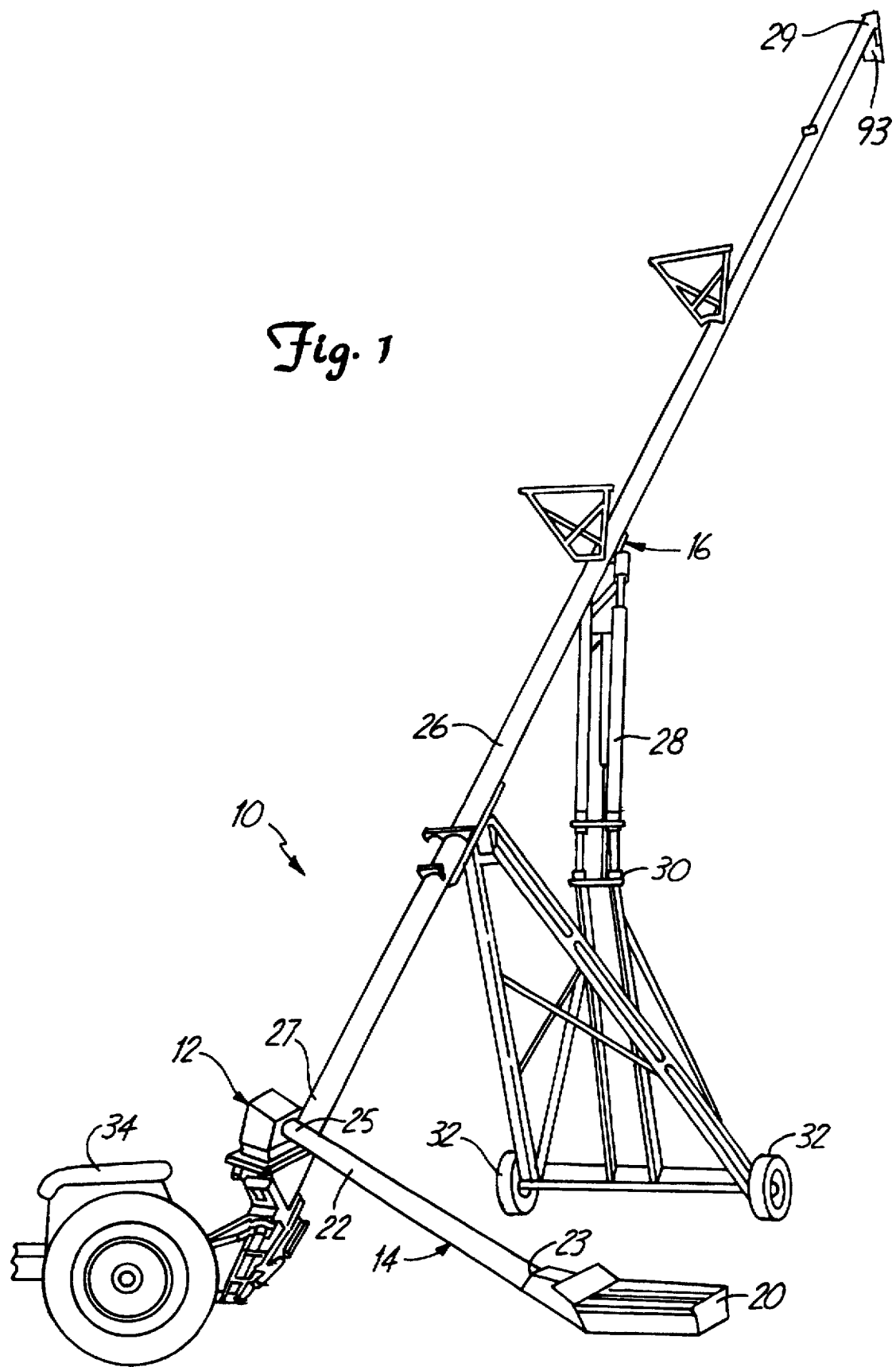
FIG. 1 is a perspective view of a portable grain conveying system that incorporates a sealed hopper joint of the present invention.
Figure 2:
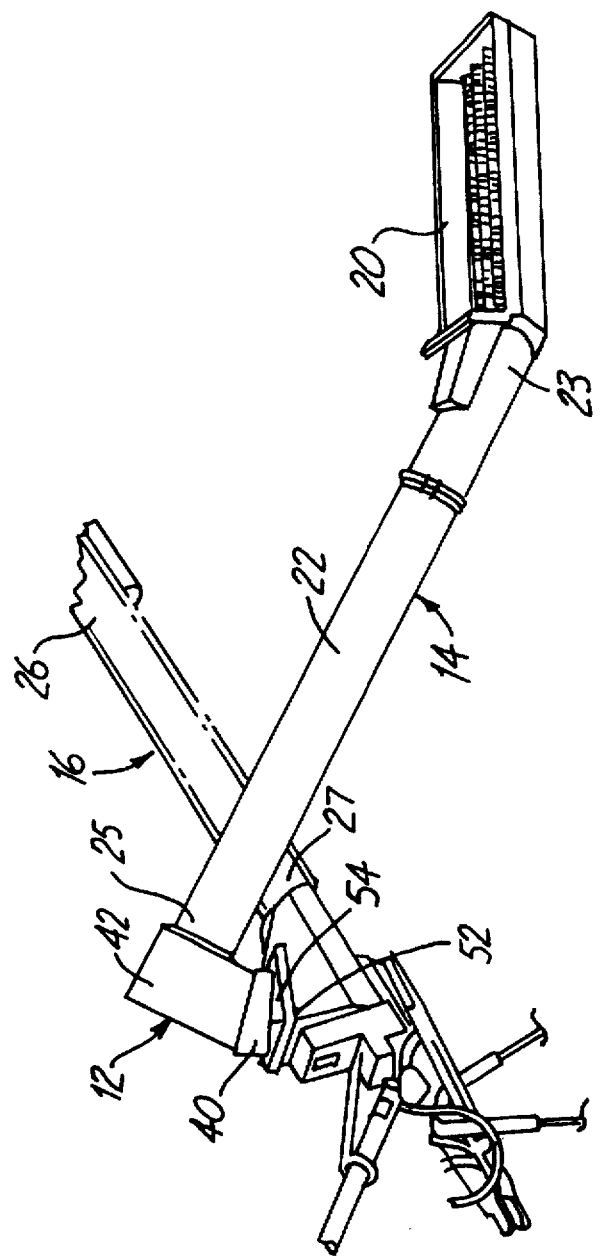
FIG. 2 is an enlarged perspective view of the sealed hopper joint.

The present invention is a portable grain conveying system 10 having a sealed hopper joint 12, as most clearly illustrated in FIGS. 1 and 2. A first portion 14 of the portable grain conveying system 10 includes a grain receiving hopper 20 that is capable of receiving grain from a truck or trailer (not shown) used to transport grain. A second portion 16 of the portable grain conveying system 10 conveys grain into a storage container (not shown), such as a silo.

The first portion 14 and the second portion 16 are pivotally attached to each other with the sealed hopper joint 12. Because of the pivotal relationship between the first portion and the second portion, this type of portable grain conveying system is conventionally referred to as a "swing around hopper" grain conveying system. When in use, the grain receiving hopper 20 is pivoted to a position underneath a grain truck or wagon for unloading grain from the grain truck or wagon.

During the process of using the portable grain conveying system 10, it is typically not possible to entirely clean out all of the grain or grain dust from the portable grain conveying system 10. When water, such as from rain or snow, gets into such a portable grain conveying system, water mixes with the grain or grain dust and forms a mud-like composition. This composition interferes with the subsequent operation of such a portable grain conveying system.

One area of the swing around hopper grain conveying system that is particularly susceptible to accumulation of grain or grain dust is the hopper joint where the first portion 14 and the second portion 16 intersect. The sealed hopper joint 12 of the present invention prevents water from entering the sealed hopper joint 12 and thereby alleviates problems associated with the undesired mixing of water and grain therein.

In addition to the grain receiving hopper 20, the first portion 14 includes a first hopper tube 22. The first hopper tube 22 preferably includes a first auger therein (not shown) for conveying the grain through the first hopper tube 22. The first hopper tube 22 has a proximal end 23 and a distal end 25. The proximal end 23 is attached to the grain receiving hopper 20 and the distal end 25 is attached to the sealed hopper joint 12.

The second portion 16 includes a second hopper tube 26 and a ground-engaging support structure 28 therefor. Similar to the first hopper tube 22, the second hopper tube 26 preferably includes a second auger therein (not shown) for conveying the grain through the second hopper tube 26. The second hopper tube 26 includes a proximal end 27 and a distal end 29. The proximal end 27 is attached to the hopper joint 12 and the distal end 29 extends to an elevated position for delivering grain to a top opening of a silo.

The support structure 28 preferably includes a height adjustment mechanism 30 and a plurality of wheels 32, which allows the portable grain conveying system 10 to be moved from location to location, and to be adjusted for use with silos having differing heights.

Operation of the portable grain conveying system 10 is preferably controlled by operably connecting the augers therein to a drive motor, such as on a farm tractor 34. Operation of the augers of the portable grain conveying system 10 is accomplished by conventional drive means, such as by hydraulic engines using hydraulic lines or by direct attachment to a power take-off shaft extending from the tractor 34.

The hopper joint 12 generally includes a lower box 40 and an upper box 42 that are pivotally mounted with respect to each other, as generally illustrated in FIG. 2. The lower box 40 includes a pair of opposed, parallel side walls 44 and a back wall 46 that extends between the side walls 44 so that the lower box 40 is substantially in the shape of the letter U. At an upper end portion 47, the back wall 46 is bent inwardly, and the side walls are formed accordingly.

Opposite the back wall 46, the lower box 40 includes an inwardly folded lip 50 that extends between the side walls 44. Proximate to the inwardly folded lip 50, the lower box 40 includes a guide rod 51 that extends between the side walls 44.

A lower portion of the lower box 40 includes a circular sleeve 52 with an outwardly extending circular flange 53 thereon. The sleeve 52 and the flange 53 fixedly mount against a circular intake boot 54 on the second hopper tube 26, as most clearly illustrated in FIG. 2, and thereby enables the intake boot 54 to remain sealed when the hopper joint 12 is rotated with respect to the intake boot 54, and provides a grain input for grain into the proximal end of the second hopper tube 26. The circular seal forms a relatively tight fit between the opposed components, so that exposure to the outside elements and the possibility for conveyed material to leak out is substantially minimized.

Figure 3:
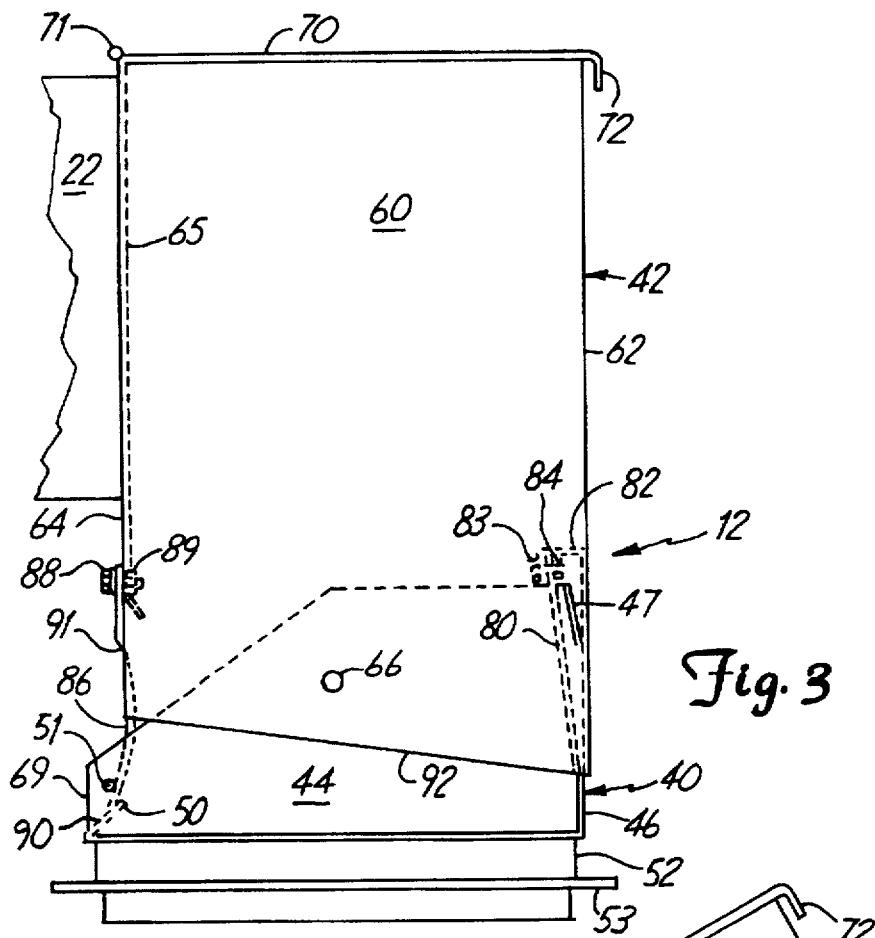
FIG. 3 is a sectional view of the sealed hopper joint in a first position.
Figure 4:
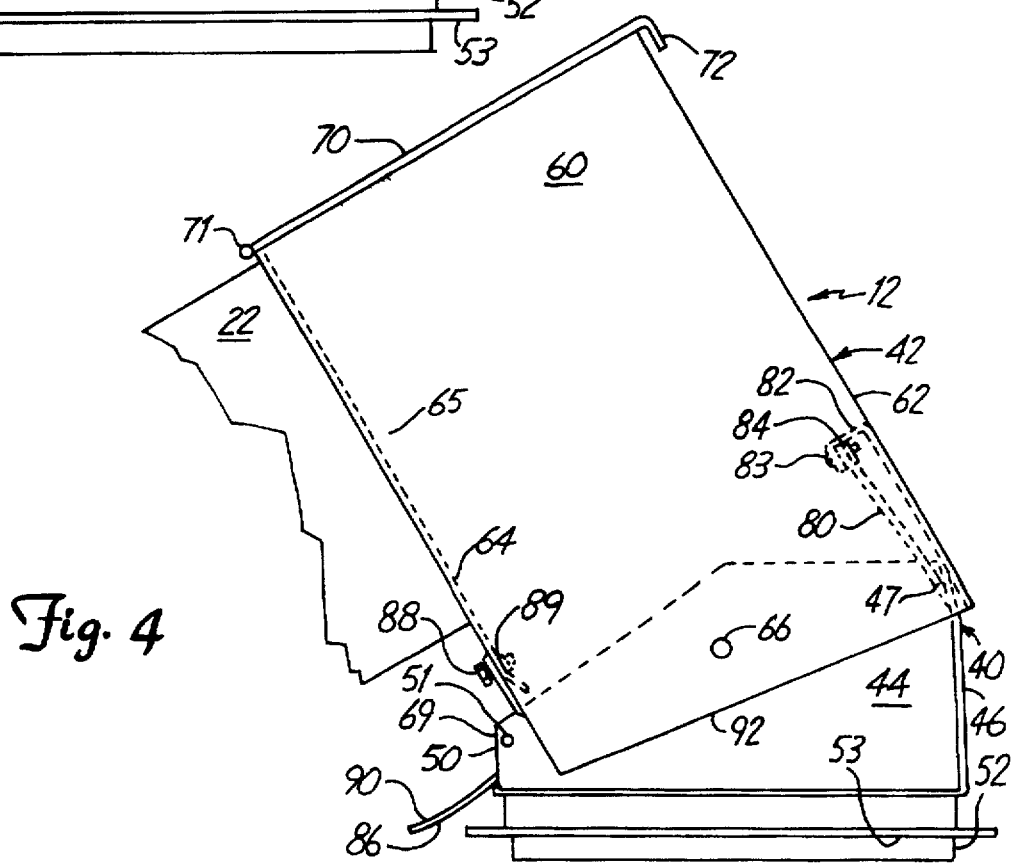
FIG. 4 is a sectional view of a sealed hopper joint in a second position.

The upper box 42 preferably has a substantially rectangular configuration with a pair of opposed, parallel side walls 60, a back wall 62, and an opposite parallel front wall 64, as most clearly illustrated in FIGS. 3 and 4. The back wall 62 and the front wall 64 are positioned opposite each other and extend between the side walls 60. The first hopper tube 22 extends through the front wall 64 of the upper box 42 via opening 65 to provide a grain outlet from the distal end of the first hopper tube 22.

The upper box side walls 60 are spaced slightly further apart than the lower box side walls 44. This configuration permits the upper box 42 to be placed over the lower box 40, with the side and back walls 60, 60, 62 of the upper box 42 outside of the side and back walls 44, 44, 46 of the lower box 40. Front edges 69 of the side walls of the lower box extend out about one inch beyond the front wall 64 of the upper box (see FIG. 3).

The upper box 42 includes a pivotally mounted top door 70 that substantially covers a top end of the upper box 42 defined by the side walls 60, 60, back wall 62, and front wall 64. The top door 70 is connected to the front wall 64 at hinge 71, and has a lip 72 that extends downwardly over the side walls 60, 60 and the back wall 62 to prevent moisture from entering the upper box 42.

The top door 70 is preferably biased in a closed position by a spring (not shown). The spring permits the top door 70 to self-pivot to an open position when grain accumulates in the hopper joint 12, thereby minimizing the build-up of pressure inside of the hopper joint 12 when a portion of the portable grain conveying system 10 is not operating correctly to advance grain therethrough.

The upper box 42 is pivotally mounted to the lower box 40 with colinear pivot pins 66 that extend through the side walls 44, 44 and 60, 60 of the boxes 40 and 42, respectively. The pivot pins 66 allow the upper box 42 to pivot while the lower box 40 remains stationary, i.e., the proximal end 25 of the first portion 14 (and hence the first hopper tube 22) could be raised and lowered without affecting the lower box 40.

The hopper joint 12 further includes a first flexible flap 80 attached to a tab 82 that extends from the back wall 62 of the upper box 42. The first flexible flap 80 is preferably selected with a width that allows the first flexible flap 80 to extend substantially between the lower box side walls 44. The first flexible flap 80 extends downwardly into the lower box 40 and thereby prevents water from entering the sealed hopper joint 12 through the gap between back walls 46 and 62. The first flexible flap 80 also prevents any of the grain conveyed through the hopper joint 12 from escaping from the hopper joint 12 through the gap between back walls 46 and 62. The first flexible flap 80 is preferably removably attached to the tab 82 using threaded fasteners such as screws 83 and nuts 84.

The hopper joint 12 further includes a second flexible flap 86 removably attached to the front wall 64 of the upper box 42. The second flexible flap 86 is preferably selected with a width that allows the second flexible flap 86 to substantially extend between the lower box side walls 44. Similar to the first flexible flap 80, the second flexible flap 86 is preferably removably attached to the front wall 64 using threaded fasteners, such as screws 88 and nuts 89.

A lower end 90 of the second flexible flap 86 extends between a guide rod 51 and the folded lip 50 to form a barrier across the gap between a lower end 91 of the front wall 64 of the upper box 42 and the folded lip 50 on the lower box 40. As the upper box 42 is pivoted with respect to the lower box 40, the second flexible flap 86 slides between the guide rod 51 and the folded lip 50. As seen in FIG. 4, the lower end 91 of the front wall 64 is spaced above a lower end 92 of each side wall 60, thereby defining the gap which is covered by the flexible flap 86 and which also allows relative pivoting of the boxes 40 and 42. The second flexible flap 86 thereby substantially seals the front side of the hopper joint 12 and prevents water and other substances from entering into the hopper joint 12. The second flexible flap 86 also prevents grain from escaping from the hopper joint 12 through the gap between the bottom edge 91 of the front wall 64 of the upper box and the folded lip 50 on the lower box 40, as the grain is conveyed through the hopper joint 12. Together the guide rod 51 and the folded lip 50 form a gap that prevents the flexible flap 86 from bowing in any other direction than what is necessary to seal the gap.

The first flexible flap 80 and second flexible flap 86 are preferably constructed from sheets one-eighth inch thick ultra high molecular weight polyethylene. The ultra high molecular weight polyethylene used to fabricate the flexible flaps preferably has an elasticity of about 110,000 psi, a Rockwell hardness of about 64 on the "R" scale, an ultimate tensile strength of about 6,800 psi at 73° F., and yield strength of about 3,400 psi at 73° F. Ultra high molecular weight polyethylene having these properties may be obtained from Tapco, Inc. of Bridgeton, Missouri. The other components of the hopper joint are preferably formed from steel or similar materials welded or bonded together for durable construction.

In operation, the portable grain conveying system 10 is positioned so that a top end 93 of the second hopper tube 26 is proximate to an upper inlet on a grain silo (not shown). A grain truck (not shown) is moved into position adjacent to the portable grain conveying system 10. Rotation of the hopper joint 12 with respect to the circular intake boot 54 and sleeve 52, and then pivoting of the upper box 42 with respect to the lower box 40 (about pivot pins 66) allows the grain receiving hopper 20 to be moved until the it is positioned beneath grain outlets on the grain truck. Next, the grain outlets are opened and the augers in the portable grain conveying system 10 are activated to convey grain from the grain truck to the silo.

If something impedes the movement of the grain in the second hopper tube 26, the grain accumulates in the hopper joint 12 and causes the top door 70 to pivot away from the upper box 42 to an open position. The top door 70 prevents pressure from building up in the portable grain conveying system 10 and thereby minimizes the likelihood of damage to the portable grain conveying system 10.

As the upper box 42 is pivoted with respect to the lower box 40 (about pivot pins 66), the first and second flexible flaps 80, 86 seal the front and back ends of the hopper joint 12, thereby preventing water from entering the hopper joint 12. The first flexible flap 80 mounted to the upper box 42 bends to allow vertical pivoting of the first portion 14 at the hopper joint 12, while retaining mating engagement between the upper box 42, and the lower box 40. The bent upper end portion 47 accommodates movement of the upper box back wall 62 relative to the lower box back wall 46 (see FIGS. 3 and 4). The second flexible flap 86 mounted to the upper box 42 engages between the folded lip 50 and the guide rod 51, and operates to bend around the guide rod 51 between the guide rod 51 and the folded lip 50 to seal the area between the upper box 42 and the lower box 40, at any angular orientation of the first portion 14 relative to the second portion 16. Thus, in a first position (FIG. 4), the flexible flap 86 bends around the guide rod 51 between the guide rod 51 and the folded lip 50, and the flexible flap 80 is pushed by the lower box 40 to provide mating engagement between the upper box 42 and the lower box 40. In another position (FIG. 3), the flexible flap 86 is retained between the guide rod 57 and the folded lip 50, and provides a seal between the upper box 42 and the lower box 40. The flexible flap 80 is pushed by the lower box 40 to provide mating engagement between the upper box 42 and lower box 40. In this way, the improved hopper joint 12 provides a sealed path for the transport of grain through first and second portions 14 and 16, at various angular orientations therebetween.

Although the present invention has been described with reference to preferred embodiments, workers skilled in the art will recognize that changes may be made in form and detail without departing from the spirit and scope of the invention.

We claim:

1. An improved auger assembly providing a sealed path for transport of grain, the improved auger assembly comprising:

a first angularly adjustable hopper tube containing a first auger for transporting grain from a first grain-containing volume;

a second hopper tube containing a second auger for transporting grain to a second grain-containing volume; and a joint mechanism coupling the first and second hopper tubes and allowing the grain transported by the first auger from the first grain-containing volume to be further transported by the second auger to the second grain-containing volume, wherein the joint mechanism comprises flexible flaps to sealably couple the first hopper tube and the second hopper tube at all angular orientations of the first hopper tube relative to the second hopper tube.

2. The improved auger assembly of claim 1, wherein the first angularly adjustable hopper tube further comprises a grain receiving hopper.

3. The improved auger assembly of claim 1, wherein the joint mechanism has a front end and back end and comprises:

a lower box having a first back wall and a pair of spaced-apart first side walls extending from the first back wall, and wherein the first angularly adjustable hopper tube is attached to the lower box; and an upper box having a second front wall, a second back wall and a pair of spaced-apart second side walls that each extend between the second front wall and the second back wall, wherein the upper box is pivotally attached to the lower box so that the pair of second side walls extend over the pair of first side walls, and wherein the second hopper tube is attached to the upper box.

4. The improved auger assembly of claim 3, wherein the flexible flaps comprise a first flexible flap and a second flexible flap.

5. The improved auger assembly of claim 4, wherein the first flexible flap is attached to the second back wall and substantially extends between the pair of spaced-apart first side walls, and wherein the first flexible flap substantially seals the back end.

6. The improved auger assembly of claim 4, wherein the second flexible flap is attached to the second front wall and substantially extends between the pair of spaced-apart first side walls, and wherein the second flexible flap substantially seals the front end.

7. The improved auger assembly of claim 6, wherein the lower box further comprises an inwardly folded flap that extends between the pair of spaced-apart first side walls opposite the first back wall.

8. The improved auger assembly of claim 7, wherein the lower box further comprises a guide rod that extends between the pair of spaced-apart first side walls proximate to the inwardly folded flap, and wherein the second flexible flap passes between the inwardly folded flap and the guide rod.

9. The improved auger assembly of claim 1, wherein the flexible flaps are formed from ultra high molecular weight polyethylene.

10. A improved auger assembly comprising:
a first hopper tube having a first proximal end and a first distal end;
a second hopper tube having a second proximal end and a second distal end;
a sealed hopper joint having a front end and a back end, the sealed hopper joint comprising:
   a lower box having a first back wall and a pair of spaced-apart first side walls extending from the first back wall, and wherein the second proximal end is attached to the lower box;
   an upper box having a second front wall, a second back wall and a pair of spaced-apart second side walls that each extend between the second front wall and the second back wall, wherein the upper box is pivotally attached to the lower box so that the pair of second side walls extend over the pair of first side walls and the second back wall extends over the second back wall, wherein the first distal end is attached to the upper box;
   a first flexible flap attached to the second back wall and substantially extending between the pair of first side walls, and wherein the first flexible flap substantially seals the back end; and
   a second flexible flap attached to the second front wall and substantially extending between the pair of first side walls, and wherein the second flexible flap substantially seals the front end; and
a grain receiving hopper attached to the first proximal end.

11. The improved auger assembly of claim 10, wherein the lower box further comprises an inwardly folded flap that extends between the pair of spaced-apart first side walls opposite the first back wall.

12. The improved auger assembly of claim 11, wherein the lower box further comprises a guide rod that extends between the pair of spaced-apart first side walls proximate to the inwardly folded flap, and wherein the second flexible flap passes between the inwardly folded flap and the guide rod.

13. The improved auger assembly of claim 1, wherein the first and second flexible flaps are formed from ultra high molecular weight polyethylene.

14. A portable grain conveying system comprising:
a first hopper tube having a pair of first lateral side walls and containing a first auger for conveying grain from a proximal end of the first hopper tube to a distal end of the first hopper tube;
a second hopper tube having a pair of second lateral side walls and containing a second auger for conveying grain from a proximal end of the second hopper tube to a distal end of the second hopper tube; and
a joint mechanism sealably coupling the proximal end of the first hopper tube to the proximal end of the second hopper tube, the joint mechanism comprising a first flexible flap to provide a sealing wall when the first lateral side wall is positively vertically displaced from the end of the second lateral side wall and to provide mating connection between the first lateral side wall and the second lateral side wall, and a second flexible flap to provide mating connection between the second lateral side wall and the second lateral side wall.

15. The portable grain conveying system of claim 14, wherein the joint mechanism has a front end and back end and comprises:
   a lower box having a first back wall and a pair of spaced-apart first side walls extending from the first back wall, and wherein the first angularly adjustable hopper tube is attached to the lower box; and
   an upper box having a second front wall, a second back wall and a pair of spaced-apart second side walls that each extend between the second front wall and the second back wall, wherein the upper box is pivotally attached to the lower box so that the pair of second side walls extend over the pair of first side walls, and wherein the second hopper tube is attached to the upper box.

16. The portable grain conveying system of claim 15, wherein the first flexible flap is attached to the second back wall and substantially extends between the pair of spaced-apart first side walls, and wherein the first flexible flap substantially seals the back end.

17. The portable grain conveying system of claim 15, wherein the second flexible flap is attached to the second front wall and substantially extends between the pair of spaced-apart first side walls, and wherein the second flexible flap substantially seals the front end.

18. The portable grain conveying system of claim 17, wherein the lower box further comprises an inwardly folded flap that extends between the pair of spaced-apart first side walls opposite the first back wall.

19. The portable grain conveying system of claim 18, wherein the lower box further comprises a guide rod that extends between the pair of spaced-apart first side walls proximate to the inwardly folded flap, and wherein the second flexible flap passes between the inwardly folded flap and the guide rod.

20. The portable grain conveying system of claim 14, wherein the flexible flaps are formed from ultra high molecular weight polyethylene.

* * * * *